(12) United States Patent
Wilcox et al.

(10) Patent No.: US 6,359,267 B1
(45) Date of Patent: Mar. 19, 2002

(54) INDUCTION HEATING SYSTEM

(75) Inventors: Dale Wilcox, West Henrietta; Girish Dahake, Scottsville, both of NY (US)

(73) Assignee: Ameritherm, Inc., Scottsville, NY (US)

( * ) Notice: Subject to any disclaimer, the term of this patent is extended or adjusted under 35 U.S.C. 154(b) by 0 days.

(21) Appl. No.: 09/625,835

(22) Filed: Jul. 26, 2000

Related U.S. Application Data
(60) Provisional application No. 60/208,091, filed on May 31, 2000.

(51) Int. Cl.[7] .................................................. H05B 6/06
(52) U.S. Cl. ...................... 219/615; 219/608; 219/650; 219/651; 219/667; 228/102; 228/221
(58) Field of Search ................................ 219/603, 608, 219/615, 633, 635, 647, 650, 651, 656, 653, 655, 665, 667, 662; 228/102, 221, 218, 219

(56) References Cited

U.S. PATENT DOCUMENTS

| | | | |
|---|---|---|---|
| 2,557,745 A | * 6/1951 | Huntley et al. ............. | 219/615 |
| 2,747,066 A | * 5/1956 | Brace ........................ | 219/651 |
| 3,639,718 A | * 2/1972 | Castonguay et al. ........ | 219/651 |
| 3,752,642 A | 8/1973 | Early et al. | |
| 3,923,232 A | 12/1975 | Houska et al. | |
| 4,329,563 A | 5/1982 | Komura et al. | |
| 4,341,947 A | 7/1982 | Komura et al. | |
| 4,942,139 A | 7/1990 | Korwin-Pawlowski | |
| 4,988,392 A | 1/1991 | Nicholson et al. | |
| 5,098,110 A | * 3/1992 | Schmatz et al. ............ | 228/102 |
| 5,116,646 A | 5/1992 | Taniguchi et al. | |
| 5,257,731 A | * 11/1993 | Nonoyama et al. ......... | 228/221 |
| 5,261,976 A | * 11/1993 | Schultz ...................... | 148/508 |
| 5,390,845 A | 2/1995 | McDonald | |
| 5,738,723 A | 4/1998 | Fleeman et al. | |
| 5,810,933 A | 9/1998 | Mountsier et al. | |
| 6,020,571 A | 2/2000 | Grossklaus, Jr. et al. | |

* cited by examiner

Primary Examiner—Philip H. Leung
(74) Attorney, Agent, or Firm—Mintz Levin Cohn Ferris Glovsky and Popeo, P.C.

(57) ABSTRACT

An induction heating system that can be used to braze metals and that overcomes many of the disadvantages of conventional brazing systems. The induction heating system improves quality and lowers production cost for many brazing requirements. The system is designed to quickly, accurately and cost effectively heat individual parts, and to replace flame brazing procedures and batch vacuum furnaces. Because the system can braze parts in an inert atmosphere or in no atmosphere (e.g., in a vacuum), no flux or acid cleaning bath is necessary and oxidation on the part is eliminated. Further, by including a gas quenching feature, the system prevents the annealing of parts and produces high quality brazed parts that meet desired hardness specifications. In one embodiment, the induction heating system includes a vacuum chamber; a support surface located within the chamber for providing a surface onto which a part to be heated is placed; moving means connected to the support surface for moving the support surface within the chamber; a vacuum system connected to the chamber for exhausting gases from the chamber; an electrically conductive coil located inside of the chamber or located adjacent to the chamber; an induction heating unit, coupled to the coil, for providing an alternating current to the coil; a temperature sensing means for sensing the temperature of the part; an operator interface for displaying a user interface comprising one or more selectable push button icons and for receiving input from an operator; and a controller interfaced to the operator interface, the vacuum system, the induction heating unit, the moving means, and the temperature sensing means.

31 Claims, 13 Drawing Sheets

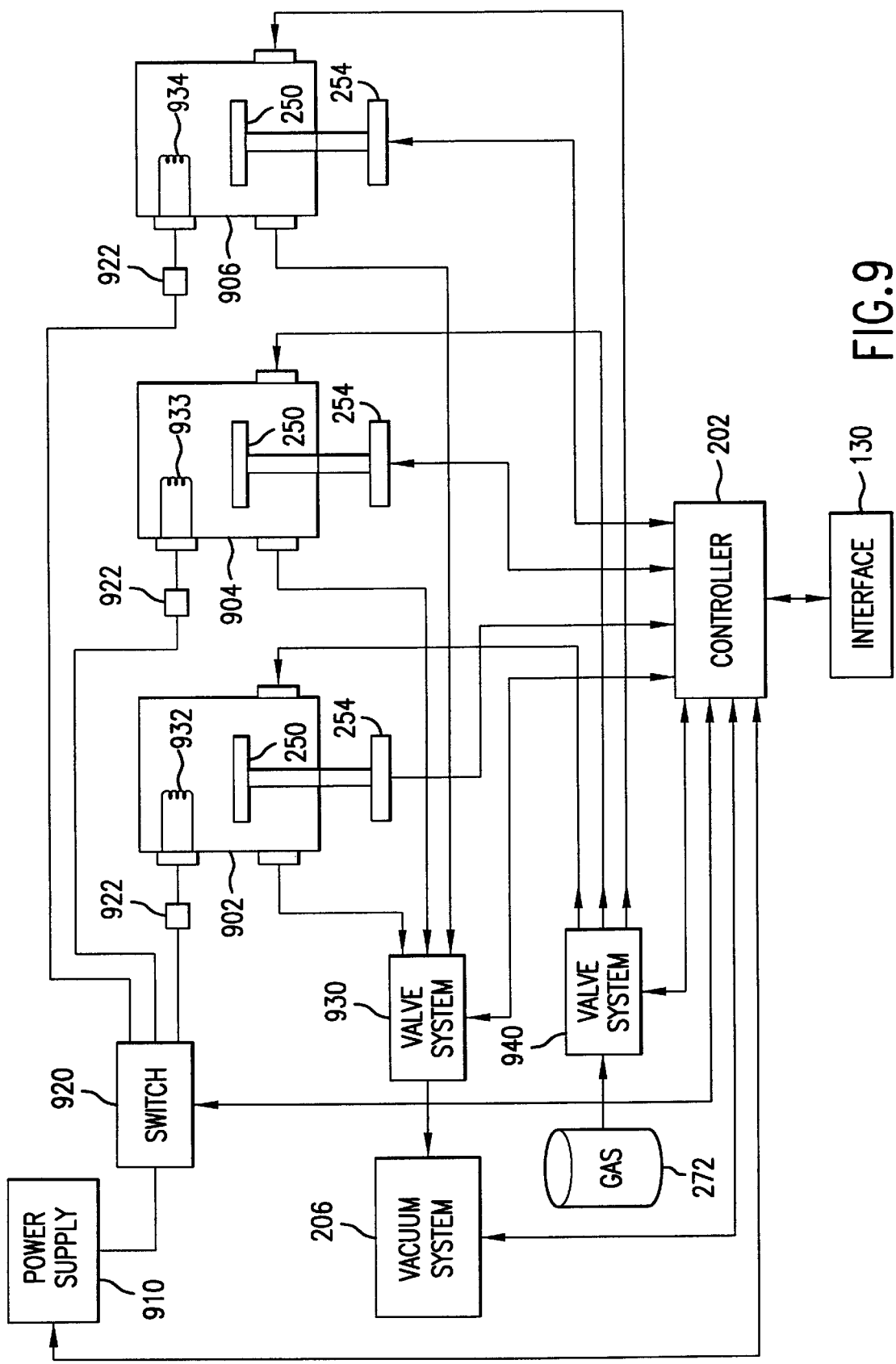

INDUCTION HEATING SYSTEM

This application claims the benefit of U.S. Provisional Patent Application No. 60/208,091, which was filed on May 31, 2000 (status pending), and which is incorporated by reference herein.

BACKGROUND OF THE INVENTION

1. Field of the Invention

The present invention is generally related to induction heating systems, and, more specifically, to an induction heating system that can be used for, among other things, brazing applications.

2. Discussion of the Background

Brazing is a process for joining metal parts. A brazing process uses heat and a filler metal to join metals parts together. Typically, the filler metal has a melting temperature above 840° F. (450° C.), but below the melting point of the parts being joined. The filler metal is either pre-placed into the joint between the parts or fed into the joint as the parts are being heated. The application of the heat causes the filler to melt and flow into the joint, usually by capillary action, thereby joining the parts.

Brazing is probably the most versatile method of metal joining today, for a number of reasons. First, brazed joints are strong. Second, brazed joints are ductile; that is, they are able to withstand considerable shock and vibration. Additionally, brazing is ideally suited to the joining of dissimilar metals.

Conventionally, the parts to be joined and the filler metal are heated in a normal atmosphere using a conventional heat source, such as a flame. Flame brazing in a normal atmosphere causes the undesirable side effects of oxidation, scaling, and carbon build-up on the parts. To clean the parts of this carbon build-up, applications of joint-weakening flux and expensive acid cleaning baths have been required.

One solution to the above problem is to use a batch vacuum furnace. However, batch vacuum furnaces have significant limitations because of their large size, batch manufacturing methods, poor efficiency, and lack of quality control.

What is desired, therefore, is a system and/or method that overcomes these and other disadvantages of conventional brazing systems.

SUMMARY OF THE INVENTION

The present invention provides an induction heating system that can be used to braze metals and that overcomes many of the disadvantages of conventional brazing systems described above. Furthermore, the induction heating system improves quality and lowers production cost for many brazing requirements. The system is designed to quickly, accurately and cost effectively heat individual parts, and to replace flame brazing procedures and batch vacuum furnaces.

Because the system can braze parts in an inert atmosphere or in no atmosphere (e.g., in a vacuum), no flux or acid cleaning bath is necessary and oxidation on the part is eliminated. Further, by including a gas quenching feature, the system prevents the annealing of parts and produces high quality brazed parts that meet desired hardness specifications.

In one embodiment, the induction heating system includes a vacuum chamber; a support surface located within the chamber for providing a surface onto which a part to be heated is placed; moving means connected to the support surface for moving the support surface within the chamber; a vacuum system connected to the chamber for exhausting gases from the chamber; an electrically conductive coil located inside of the chamber or located adjacent to the chamber; an induction heating unit, coupled to the coil, for providing an alternating current to the coil; a temperature sensing means for sensing the temperature of the part; an operator interface for displaying a user interface comprising one or more selectable push button icons and for receiving input from an operator; and a controller interfaced to the operator interface, the vacuum system, the induction heating unit, the moving means, and the temperature sensing means.

Advantageously, the controller is programmed to perform a procedure in response to an operator selecting one of the selectable push button icons. The procedure includes the steps of: sending a signal to the moving means to cause the moving means to move the support surface so that the part is appropriately located with respect to the coil; sending a signal to the vacuum system to cause the vacuum system to exhaust gases from the chamber; monitoring the pressure within the chamber; after the pressure within the chamber reaches a predetermined threshold, sending a signal to the induction heating unit to cause the induction heating unit to provide to the coil an alternating current having sufficient power to heat the part to a predetermined temperature; waiting for a predetermined amount of time; and after the predetermined amount of time has elapsed, sending a signal to the induction heating unit causing the induction heating unit to stop providing the alternating current to the coil.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 9 is a block diagram of an induction heating system having more than one chamber.

DETAILED DESCRIPTION OF THE PREFERRED EMBODIMENTS

Figure 1:
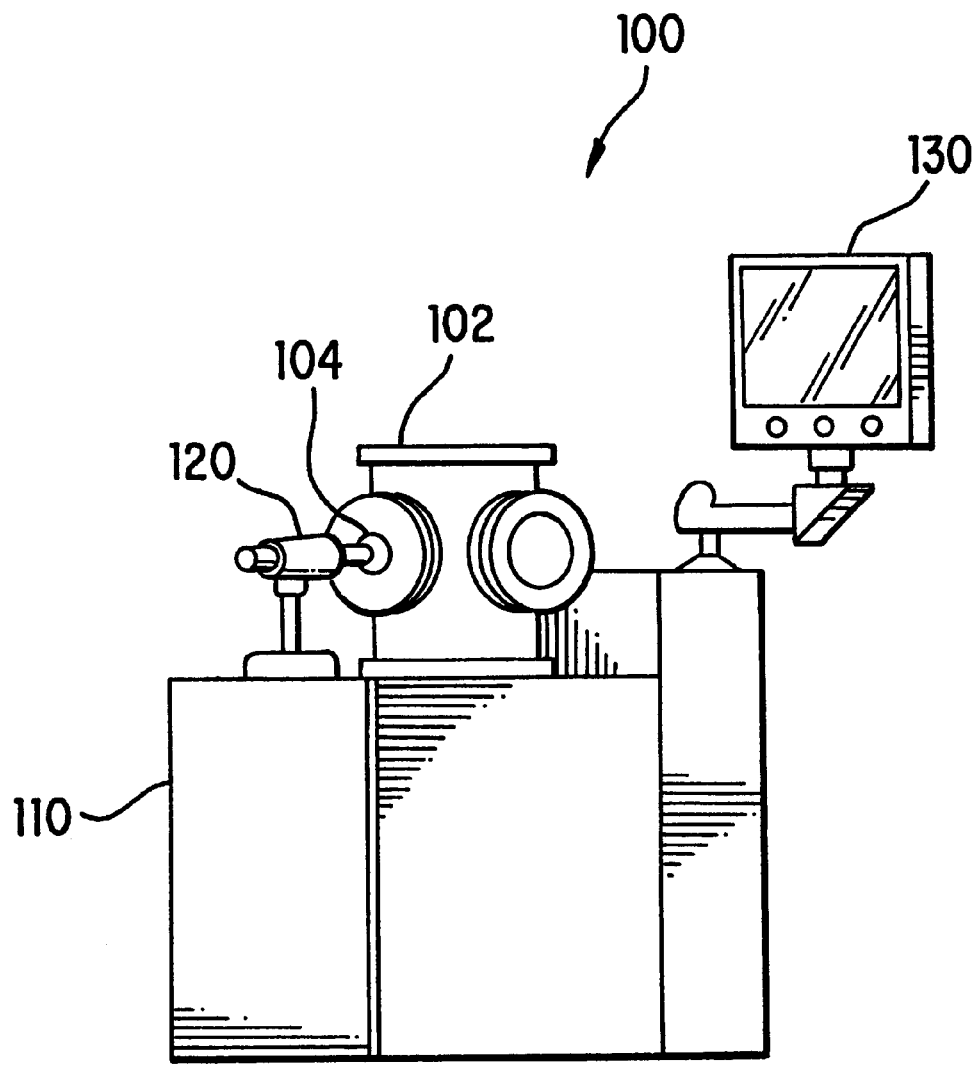
FIG. 1 is an illustration of an induction heating system according to one embodiment.

FIG. 1 is an illustration of one embodiment of the induction heating system 100. As shown in FIG. 1, induction heating system 100 includes a vacuum chamber 102 sitting on top of housing 110 and an operator interface 130 for allowing an operator of heating system 100 to control all aspects and components of heating system 100. The part to be heated is placed within vacuum chamber 102. In one embodiment, housing 110 holds, among other things, an induction heating unit, a vacuum system, an atmospheric control system, and a master control system, all of which are shown in block diagram form in FIG. 2. Preferably, an infrared pyrometer 120, for measuring the temperature of the parts to be heated, is included in the heating system 100. The master control system controls the induction heating system, the vacuum system, the atmospheric control system, the operator interface 130 and receives temperature data from the infrared pyrometer 120.

In one embodiment, the vacuum chamber 102 is a metal chamber (e.g., stainless steel) with a quartz window 104. Quartz window 104 enables an optional infrared pyrometer 120 to measure the temperature of the part being heated. In another embodiment, the vacuum chamber 102 is quartz tube. Whether vacuum chamber 102 is a metal chamber or a quartz tube depends on the application for which the heating system 100 is being used.

Figure 2:
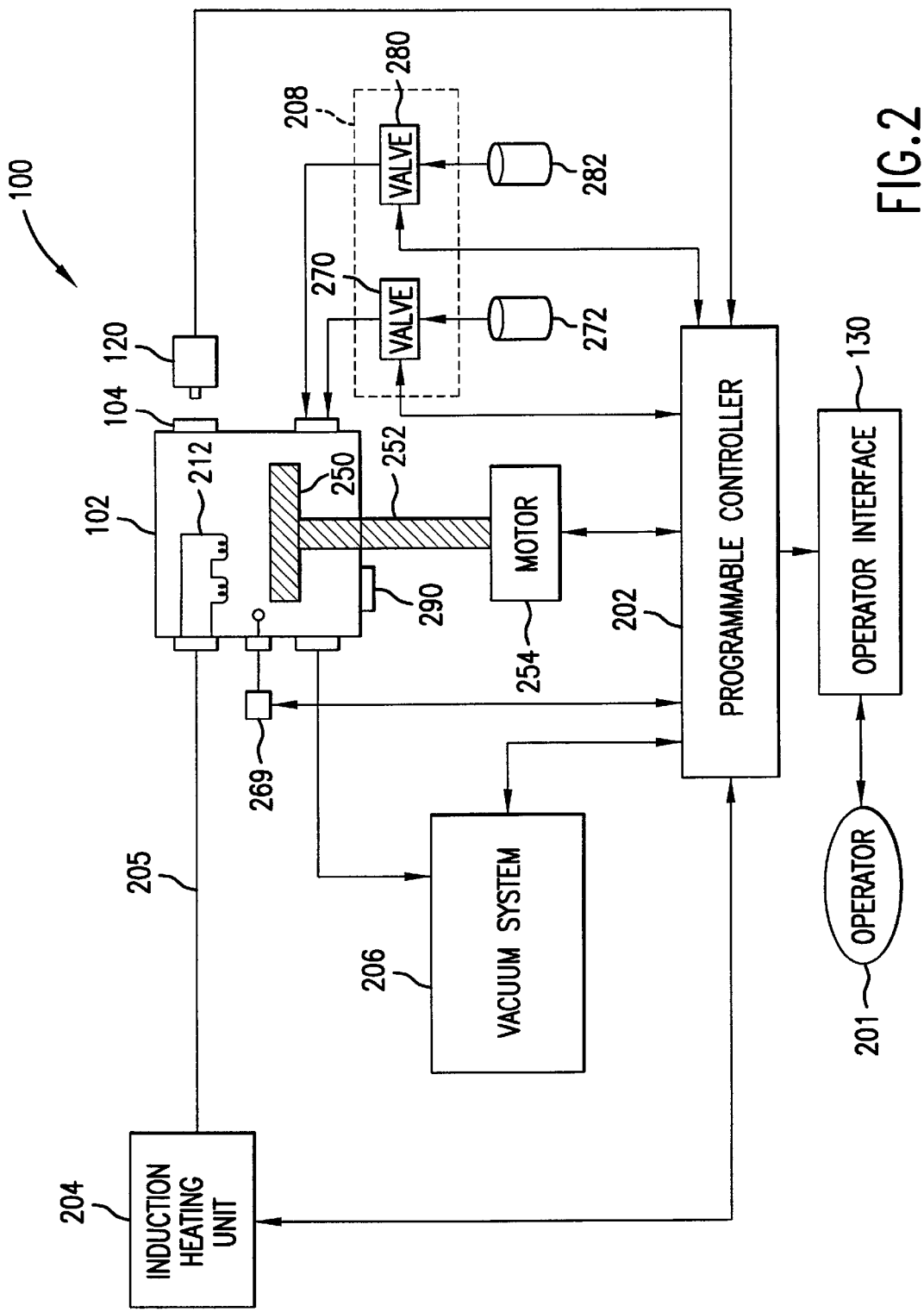
FIG. 2 is a block diagram of the induction heating system.

FIG. 2 is a functional block diagram which illustrates the various components of heating system 100 mentioned above. As shown in FIG. 2, a master control system 202 is interfaced with an induction heating unit 204, a vacuum control system 206, an atmospheric control system 208, a servo motor 254, operator interface 130, a pressure sensor 269, and infrared pyrometer 120. As described above, the master control system 202 controls the operation of the components of heating system 100 to which it is interfaced by transmitting control signals thereto. In a preferred embodiment, master controller is the Micrologix™ 1500 programmable controller from Rockwell Automation of Mayfield Heights, Ohio (www.ab.com). However, control system 202 can be implemented with any programmable processing device, including a personal computer, a workstation etc.

Induction heating unit 204 functions to provide an alternating current to an electrically conductive coil 212 (e.g., copper coil). The frequency of the alternating current provided by induction heating unit 204 is in the radio frequency (RF) range. Preferably, induction heating unit 204 includes an RF power supply (not shown) connected to a tank circuit (not shown), wherein coil 212 is connected to the tank circuit. In one embodiment, the tank circuit is a parallel resonant tank circuit. By using a parallel resonant tank circuit, a low voltage coil 212 can be used. A low voltage coil is preferred because using a low voltage coil reduces the chances of arcing.

In the embodiment shown in FIG. 2, coil 212 is placed within vacuum chamber 103. However, in other contemplated embodiments, such as the embodiment in which vacuum chamber 102 is implemented with a quartz tube, the coil is not placed within vacuum chamber 102, but is placed in proximity thereto. Induction heating unit 204 and coil 212 are commonly available and can be purchased from Ameritherm, Inc. of Scottsville N.Y. as well as other vendors of induction heating equipment. Additionally, an induction heating unit that could be used with heating system 100 is described in U.S. patent application Ser. No. 09/113,518, filed Jul. 10, 1998, entitled "RF Power Supply", which is assigned to the assignee of the present invention and which is incorporated herein by this reference.

Figure 3:
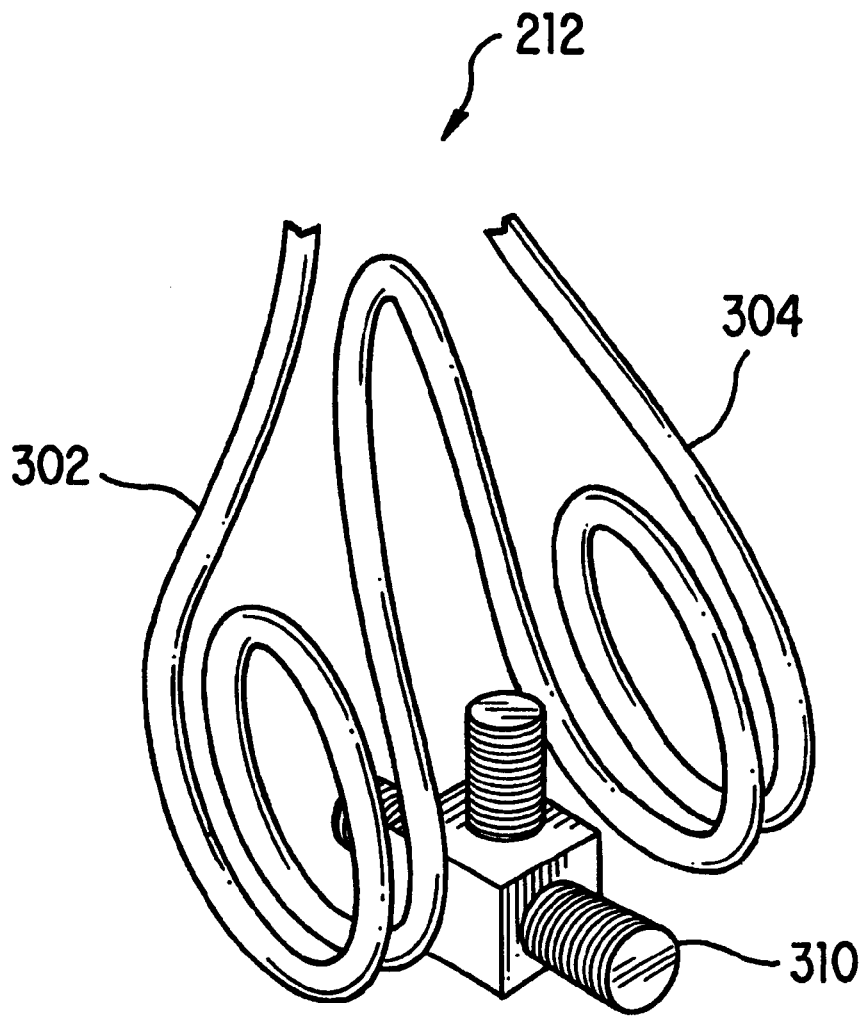
FIG. 3 is a figure of an exemplary coil.

FIG. 3 illustrates an exemplary embodiment of coil 212. As shown in FIG. 3, in one embodiment, coil 212 has a first winding 302 and a second winding 304. A part 310 to be heated or brazed is placed between first winding 302 and second winding 304. As described above, induction heating unit 204 provides an alternating current to coil 212. An electromagnetic field emanates from the coil as the alternating current flows through the coil. It is this electromagnetic field that is used to heat the part 310. As the coil design is influenced by the shape of the part 310 to be heated, the invention is not limited to any specific coil design.

Figure 4:
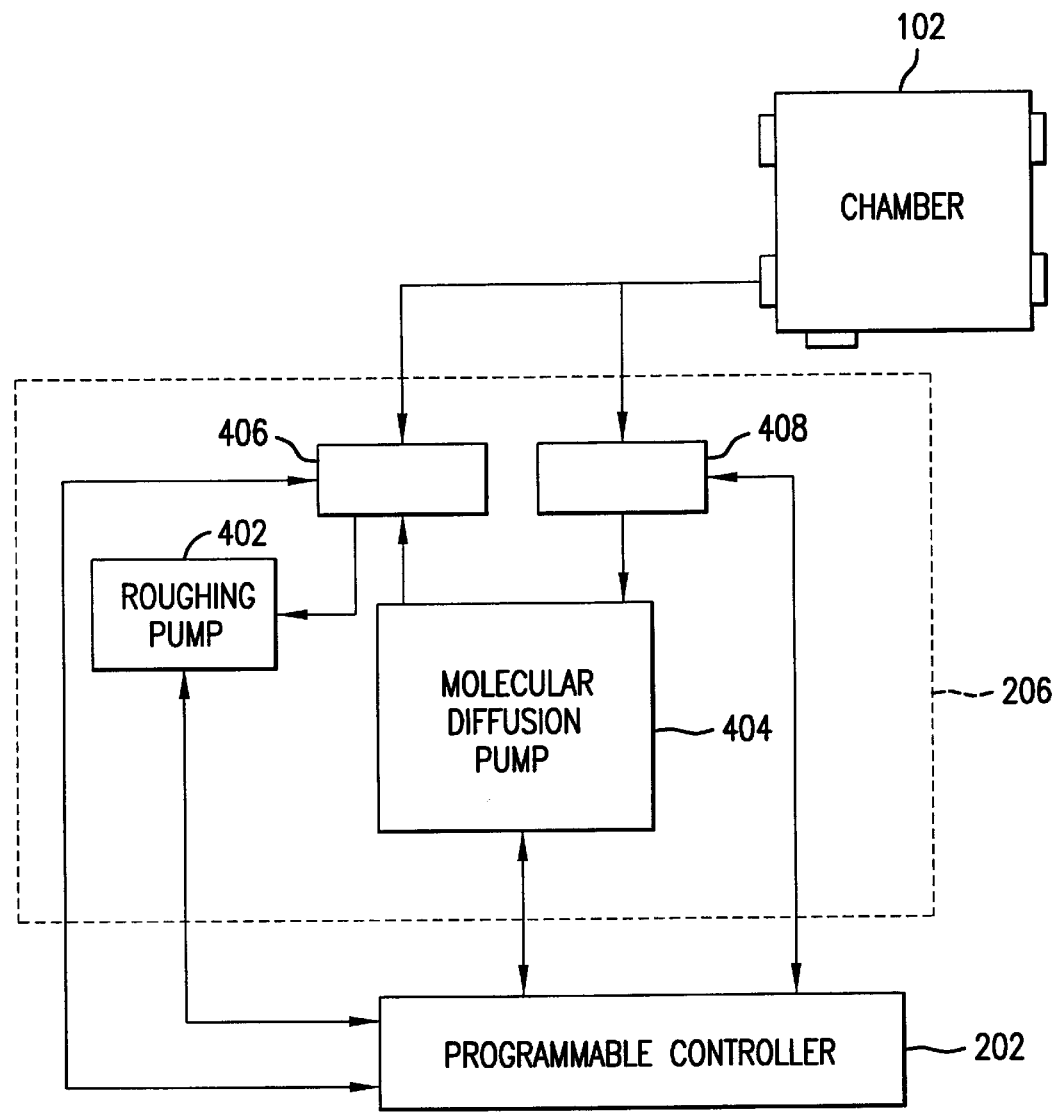
FIG. 4 is a block diagram of one embodiment of a vacuum system.
Figure 6:
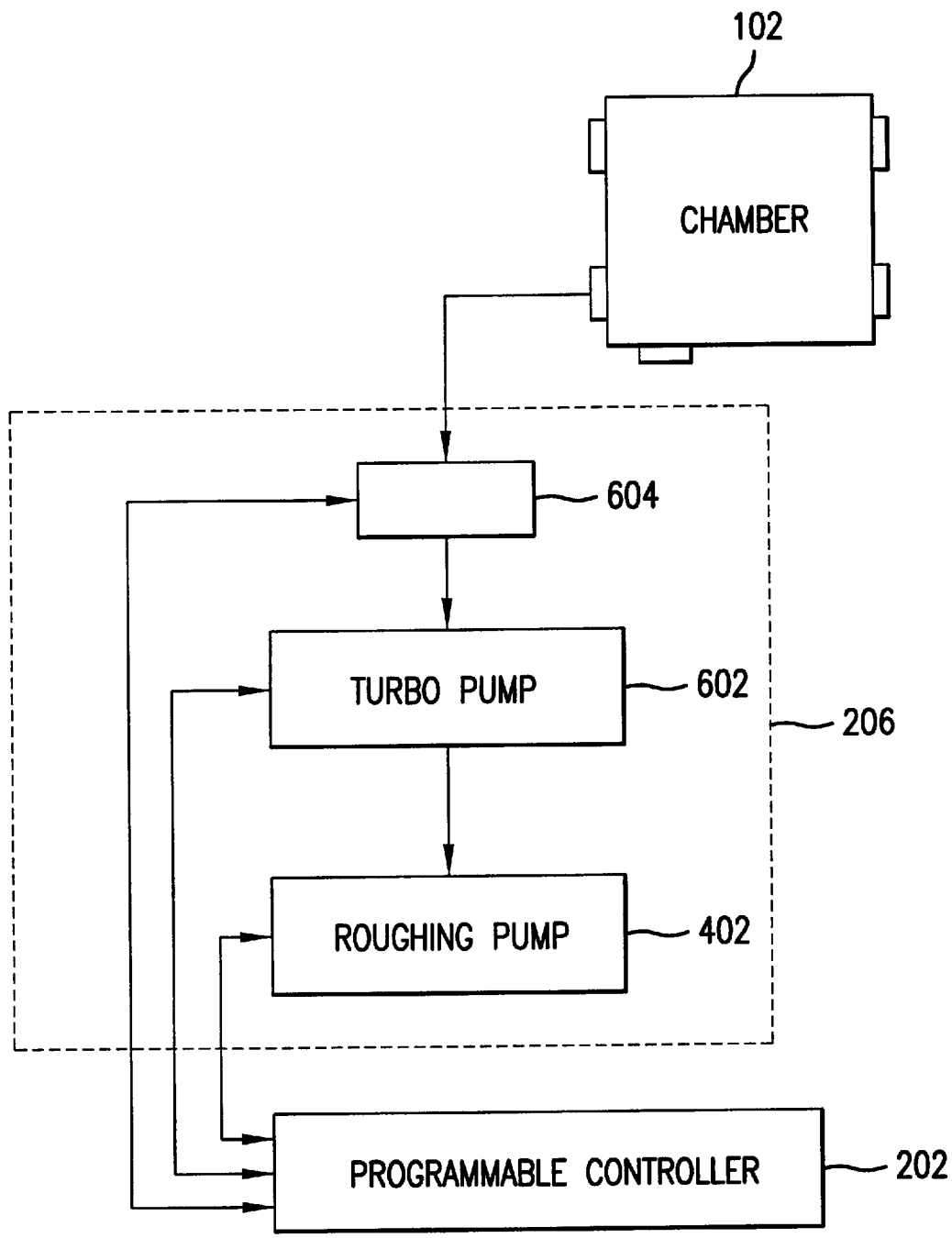
FIG. 6 is a block diagram of another embodiment of the vacuum system.

Vacuum system 206 functions to remove gases from chamber 102, thereby reducing the pressure within chamber 102 (assuming the temperature and volume of the chamber do not change). FIGS. 4 and 6 each illustrate an exemplary embodiment of vacuum system 206. One skilled in the art should understand that the invention is not limited to any specific vacuum system embodiment and that FIGS. 4 and 6 are provided merely for illustration and do not serve to limit the invention.

Figure 5:
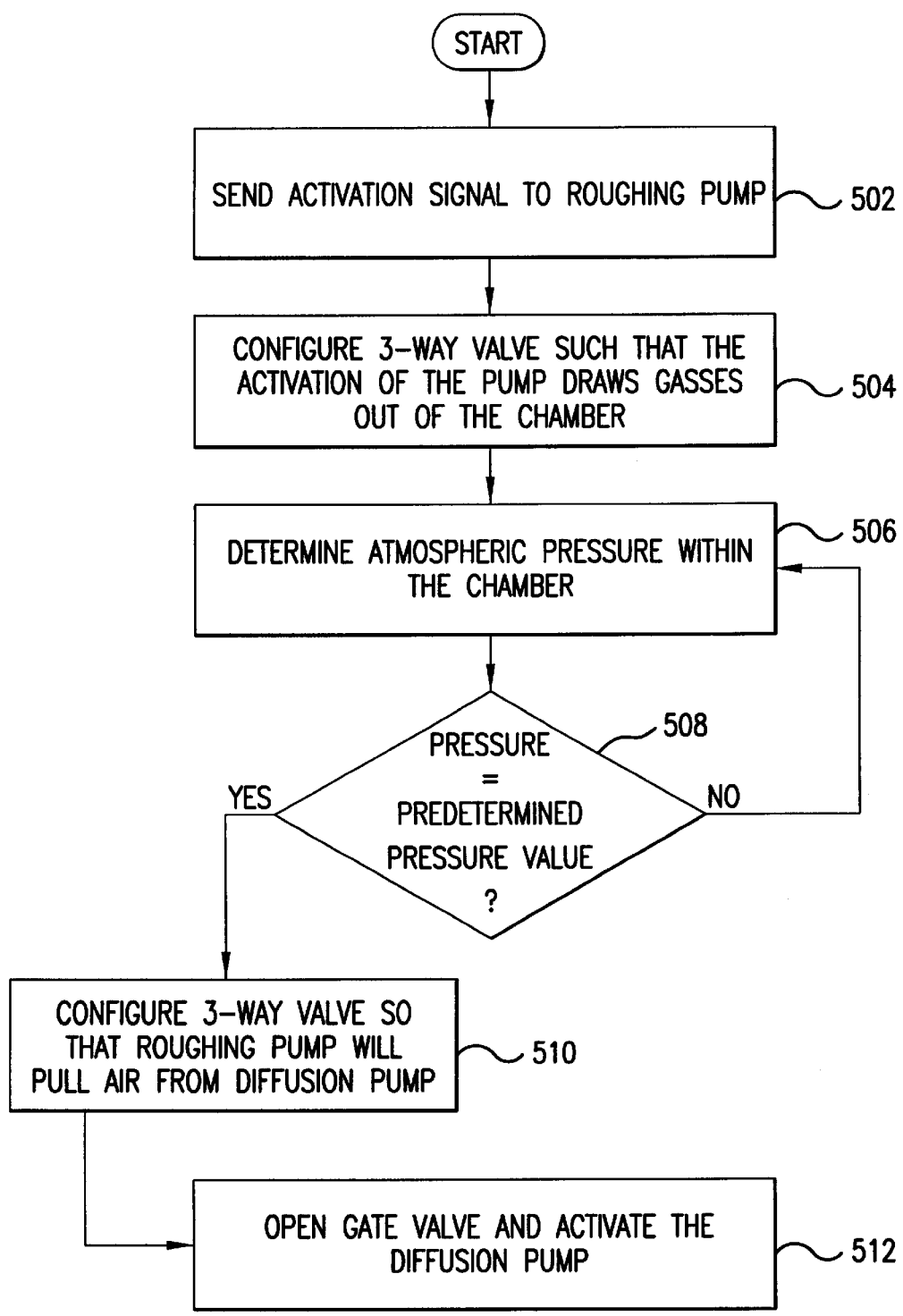
FIG. 5 is flow chart illustrating the process of using the vacuum system shown in FIG. 4.

As shown in FIG. 4, in one embodiment, vacuum system 206 includes a "roughing" pump 402, a molecular diffusion pump 404, a three-way valve 406, and a gate valve 408. Master controller 202, chamber 102, roughing pump 402, and diffusion pump 404 are all connected to three-way valve 406, whereas only master controller 202, diffusion pump 404 and vacuum chamber 102 are connected to gate valve 408. FIG. 5 illustrates a process 500 performed by master controller 202 to create a vacuum (i.e., to reduce the air pressure) within vacuum chamber 102 using the vacuum system illustrated in FIG. 4.

Process 500 begins in step 502 where master controller 202 sends to roughing pump 402 a signal that causes roughing pump to begin pumping. At the same time, master controller 202 configures three-way valve 406 such that the gases within chamber 102 will be removed therefrom by the pumping action of roughing pump 402 (step 504). While roughing pump 402 is removing the gases from chamber 102, master controller 202 determines the pressure within chamber 102 (step 506) by reading the output of pressure sensor 269. In step 508, controller 202 compares the pressure determined in step 506 with a predetermined pressure value. If the determined pressure is less than or equal to the predetermined value, then control passes to step 510, otherwise control returns to step 506. In step 510, controller reconfigures valve 406 such that roughing pump 402 will pull air from diffusion pump 404 instead of from chamber 102. Next (step 512), controller opens valve 408 and sends a signal to diffusion pump 404 to cause it to begin exhausting the gases within chamber 102.

FIG. 6 illustrates another embodiment of vacuum system 206. As shown in FIG. 6, vacuum system 206 includes roughing pump 402, a turbo molecular pump 602 ("turbo pump"), and a gate valve 604. Roughing pump 402 is connected to turbo pump 602 which is connected to chamber 102 through gate valve 604. The turbo pump 602 functions to pump gases out of chamber 102, and roughing pump 402 functions as a backing pump to the turbo pump 602. That is, roughing pump 402 pumps gases out of the turbo pump 602. The process performed by controller 202 to reduce the air pressure within chamber 102 is straightforward process. The process begins with controller 202 sending a signal to roughing pump 402 and turbo pump 602 that causes both of them to begin pumping. At or about the same time, controller 202 opens gate valve 604 such that gas molecules and other molecules within chamber 102 are exhausted by the pumping action of turbo pump 602. While the pumps are activated, controller 202 monitors the pressure within chamber 102.

Referring again to FIG. 2, the atmospheric control system (ACS) 208 will be described. In one embodiment, ACS 208 includes a gate valve 270 for connecting a gas source 272 to vacuum chamber 102. Gate valve 270 is controlled by controller 202. That is, controller 202 can open and close valve 270. The gas provided by gas source 272 is used to quench (i.e., cool) the part(s) that was/were heated. That is, in some applications it is necessary to cool the part immediately after it has been heated. One example of such an application is the copper brazing of steel components. To cool the part, the controller 202 configures valve 270 such that a large amount of the gas provided by source 272 will flow into the chamber, thereby quenching the part that was heated. Preferably, gas source 272 provides an inert gas, such as Argon or Helium.

In another embodiment, ACS 208 further includes a second gate valve 280 for connecting a second gas source 282 to vacuum chamber 102. The gas provided by gas source 282 is used to provide an inert atmosphere in which to heat or braze parts. Some applications, such as the brazing of silver, copper, steel or brass alloys, should be performed in an inert atmosphere, while others, such as brazing nickel alloys with nickel, should be performed in a near vacuum environment. Therefore, depending on the type of material that is being heated, gas source 282 may or may not be needed. In those applications where gas source 282 is needed, controller 202 is preferably programmed to direct vacuum system 206 to remove the air from chamber 102 and, once most of the air is removed, to configure valve 280 to allow the gas from gas source 282 to flow into chamber 102 before activating induction heating unit 204. In this manner, the part will not be heated until the chamber contains only the gas provided from gas source 282.

Still referring to FIG. 2, in one embodiment, heating system 100 includes a support surface (e.g., a table) 250 that is provided within chamber 102. Support surface 250 is connected, through a rotary/linear vacuum feedthrough 252, to a servo motor 254, which is interfaced with controller 202. Servo motor 254 functions to move support surface 250 upwards and downwards and/or to rotate support surface 250.

Controller 202 uses servo motor 254 to move the part to be heated into position within the coil. That is, a number of parts or assemblies can be loaded on to support surface 250 and controller 202 can move support surface 250 so that each part can be heated in turn. For example, after a part on the support surface 250 has been heated as required, controller 202 can direct motor 254 to move support surface 250 so that the next part to be processed is placed in the appropriate location with respect to coil 212. Once this part is in the correct location with respect to the coil 212, controller 202 will direct induction heating unit 204 to provide the alternating current to the coil 212, thereby heating the part. This automatic process can continue until all the parts that have been placed on the support surface 250 have been processed as required.

Also shown in FIG. 2 is a thermocouple feed-through 290 for allowing a thermocouple (not shown) to be placed inside of chamber 102 to measure the temperature of the part(s) being heated. The thermocouple can be used in place of the infrared pyrometer 120 or it can be used to periodically calibrate the infrared pyrometer 120.

Figure 7:
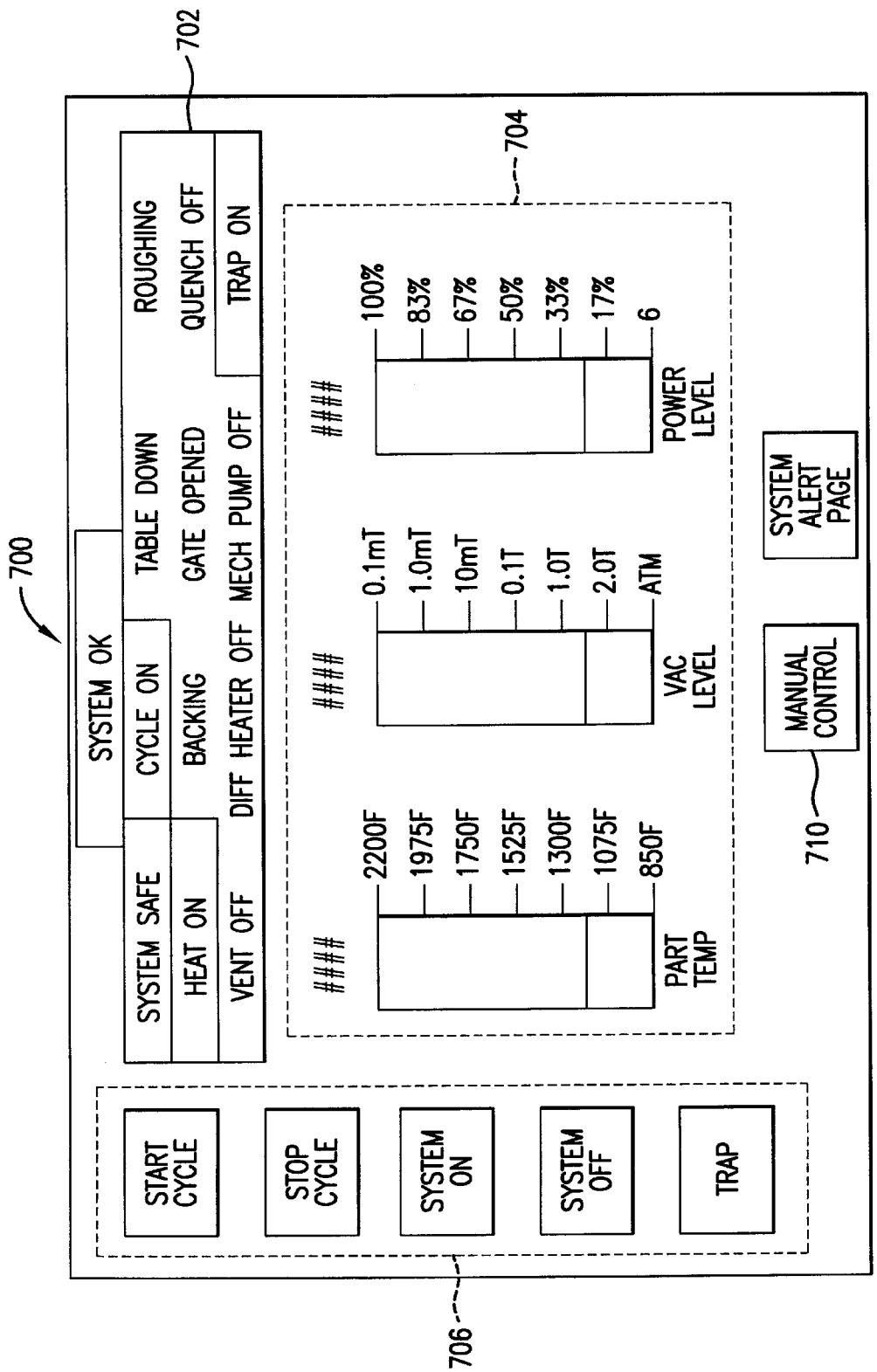
FIG. 7 is a representation of a first user interface screen.
Figure 8:
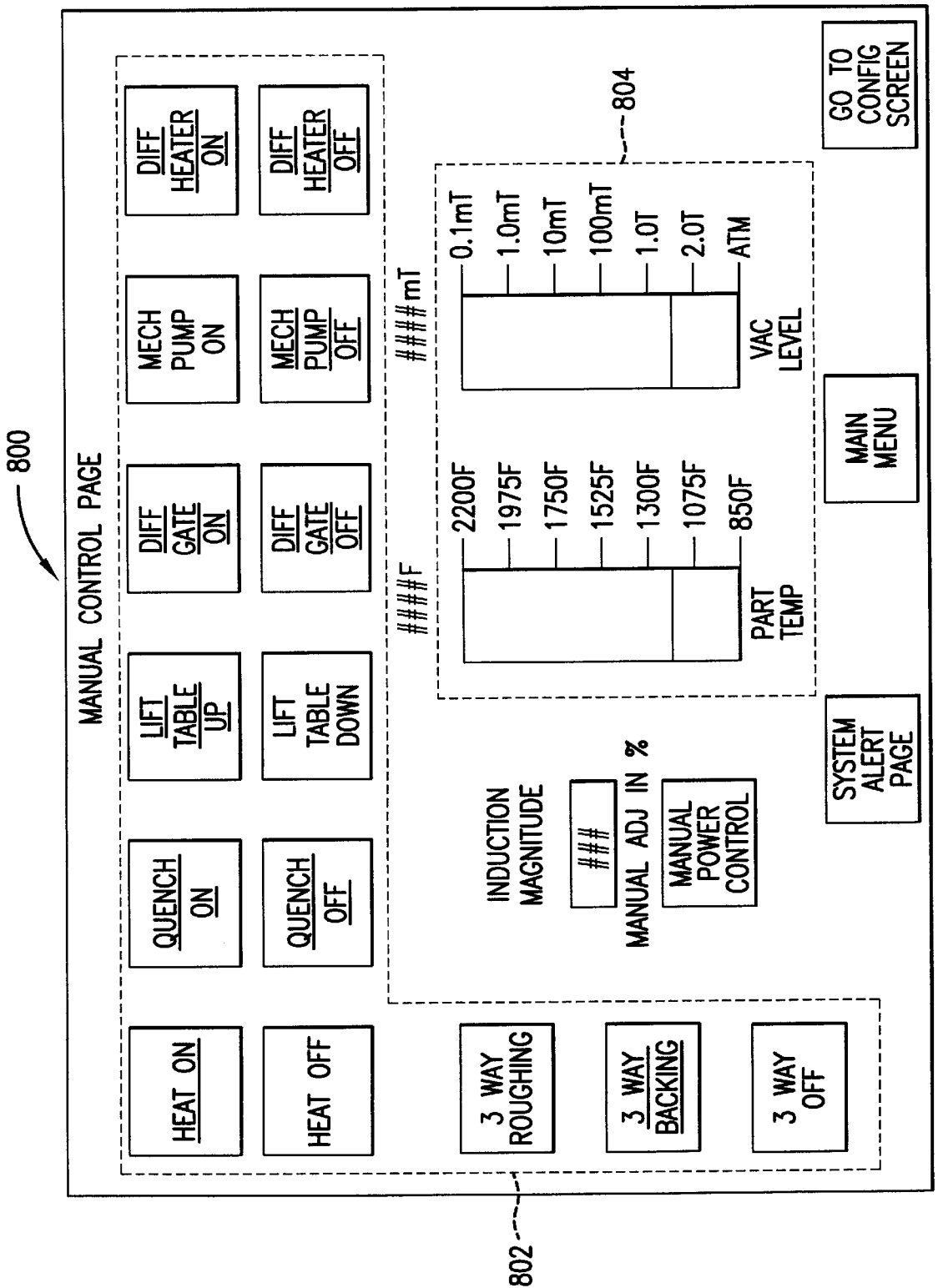
FIG. 8 is a representation of a second user interface screen.

Referring now to the operator interface 130, operator interface 130 provides a graphical user interface to operator 201. The user interface enables operator 201 to issue commands to, and receive information from, controller 202. In one embodiment, operator interface 130 is a touch-screen display. In other embodiments interface 130 includes a standard computer display monitor in combination with a keyboard and/or mouse or other input device. FIGS. 7 and 8 illustrate a main menu screen 700 and a manual control screen 800, respectively, both of which are displayed to the operator 201 via operator interface 130.

When controller 202 is powered on, main menu screen 700 is displayed on interface 130. Referring to FIG. 7, Screen 700 includes three sections. A top center section 702 displays current system operational status. In this section, the operator may take one look to determine exactly what is occurring in the system. A middle section 704 has real-time bar graphs showing the key process characteristics: (1) temperature of the part being processed, (2) pressure level in the chamber 102, and (3) power output from the power supply within induction heating unit 204. A left section 706 of screen 700 includes push button icons for starting an automatic process performed by controller 202 and for stopping the automatic process. That is, activating a particular push button causes operator interface 103 to send a predetermined signal to controller 202. In response to receiving the predetermined signal, controller 202 performs a series of predefined steps. For example, in response to the predetermined signal, the controller 202 could be programmed to send control signals to any one or more of the various components shown in FIG. 2 to which controller 202 is interfaced so as to perform a brazing process such as the one shown in FIGS. 10A and 10B or FIGS. 11A and 11B.

There is also provided a push button icon 710 for switching to a manual mode of operation. When push button icon 710 is selected, manual control screen 800 is displayed. Manual control screen 800 may be used for process development and/or trouble shooting. Included in screen 800 are bar graphs 804 for providing real-time feedback of the temperature of the part being processed and the pressure level in the chamber 102.

Every function is available to the operator through a number of push button icons 802 displayed on the screen 800. Thus, the operator can configure all the valves, start and stop the pumps, activate the induction heating system, etc. merely by activating the appropriate push button icon. Upon activating a push button icon, the operator interface 130 sends to the controller 202 a signal that indicates which push button icon was activated. In response to receiving the signal, controller 202 performs some action depending on which push button was activated. For example, if the activated push button is labeled "Heat On", controller 202 sends a control signal to induction heating unit 202 that causes the unit 202 to heat the part by providing alternating current to the coil 212.

If a very large number of parts need to be processed in a short amount of time, it is possible to expand heating system 100 to include more than one chamber 102. Such an expanded heating system 900 is shown in FIG. 9. The advantage of expanded heating system 900 is that it can process more parts per minute than heating system 100. Heating system 900 is shown having three chambers (902, 904, and 906), however, heating system 900 is not limited to this number of chambers. Although not shown in FIG. 9, there is a pressure sensor associated with each chamber for measuring the pressure in the chamber.

Advantageously, heating system 900 does not require more than one vacuum system 206. This is because vacuum system 206 is coupled to each of the chambers 902–906 by a valve system 930, which includes one or more valves. Similarly, heating system 900 only requires one induction heating power supply 910, one quench/atmosphere gas source 272, one controller 202, and one operator interface 130. Power supply 910 is coupled to each coil 932, 933, and 934 through a contactor 920 and an optional tank circuit 922. Gas source 272 is coupled to each chamber 902–906 by valve system 940, which includes one or more valves.

At the start up of heating system 900, a part(s) are loaded into chamber 902 and the automatic process for chamber 902 will initiate. The automatic process includes the steps of: (1) moving the part(s) to be processed close to the coil 932, (2) pumping down the chamber 902 (i.e., removing the air and other molecules from chamber 902) to reach the desired pressure level, (3) introducing an inert gas into the chamber 902 (this step is optional), (4) configuring contactor 920 such that the alternating current created by power supply 910 is provided to coil 932 to create an electromagnetic field (EMF) for heating the part(s), and (4) quenching the part using a quenching gas after the part has been heated as required for the particular application. After completion of step (2), controller 202 configures valve system 930 so that the pumping action of vacuum system 206 will exhaust the gas within chamber 904. After valve system is so configured, the automatic process for chamber 904, which is similar to that of chamber 902, will initiate.

Similarly, after the pressure in chamber 904 has reached the desired level, controller 202 configures valve system 930 so that the pumping action of vacuum system 206 will exhaust the gas within chamber 906. After valve system is so configured, the automatic process for chamber 906, which is similar to that of chambers 902 and 904, will initiate. In this manner, a number of parts can be processed in parallel, thereby increasing the number of parts that can be processed in a given amount of time.

Heating system 100 and heating system 900 can be used in a wide variety of heating applications. In particular, heating system 100 and 900 are well suited for brazing application. Such brazing applications included brazing silver, brass alloys, copper, steel, and nickel components using silver, copper or nickel alloys as the filler metal.

Because heating system 100 and 900 include programmable controller 202, almost any heating application can be automated by programming the controller 202. That is, with a single push of a button, an entire brazing process can be carried out and handled by the controller.

Figure 10A:
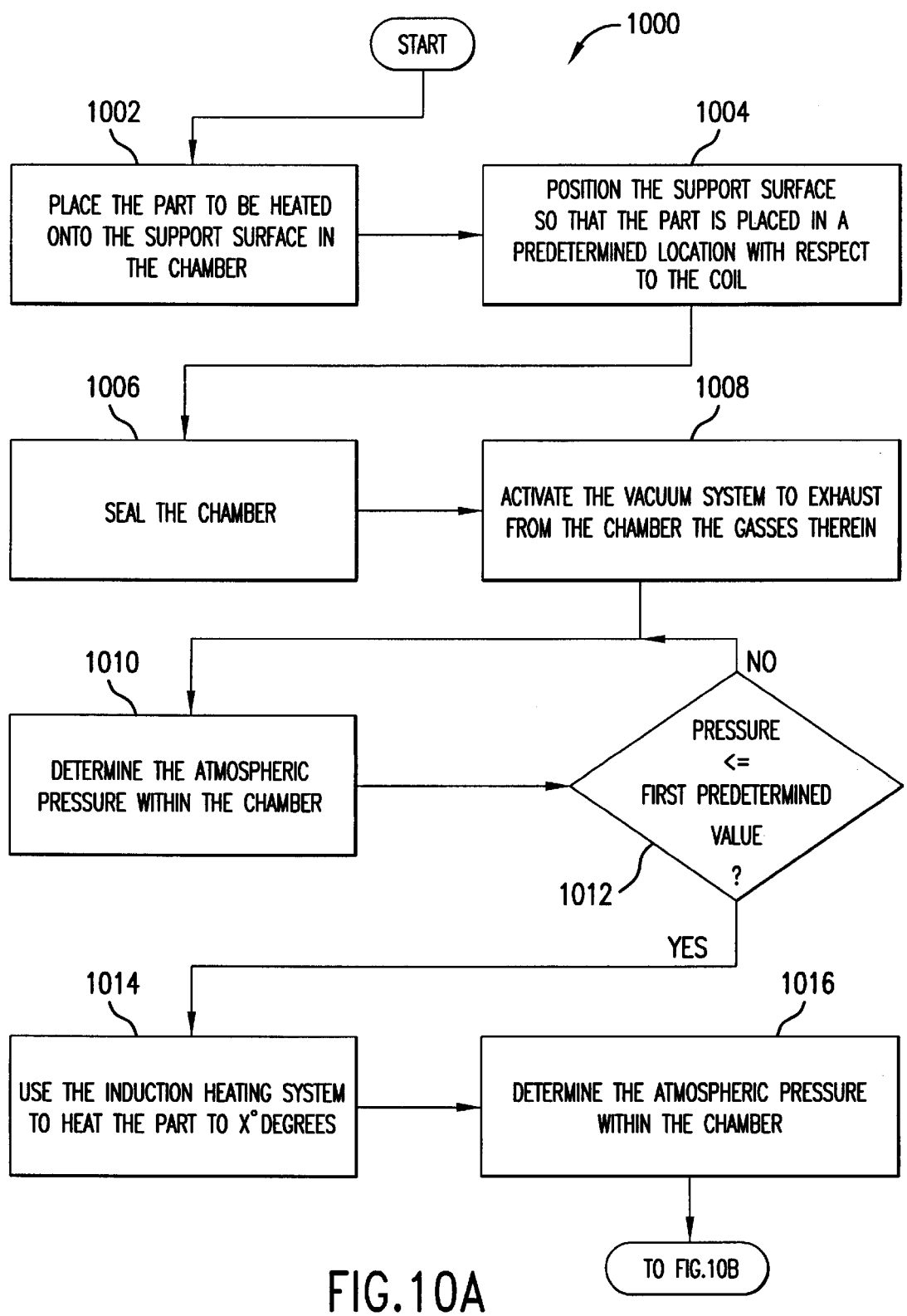
FIGS. 10A and 10B are a flow chart illustrating a brazing process.
Figure 10B:
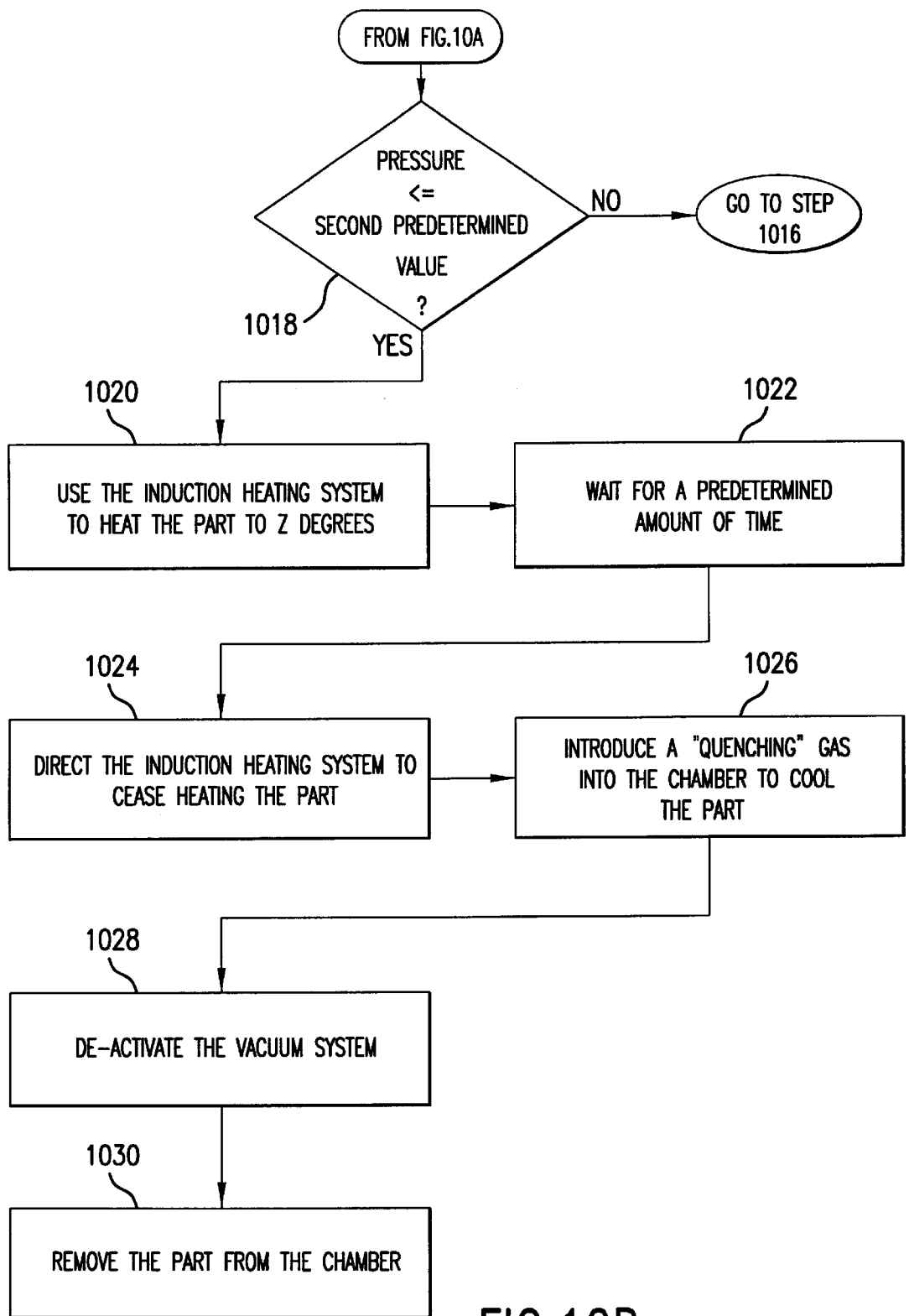

FIGS. 10A and 10B illustrate a process 1000 for brazing parts using heating system 100 and using as the filler metal a paste, such as a nickel alloy paste. One skilled in the art of computer programming can program controller 202 to perform one or more of the steps of process 1000.

Process 1000 begins in step 1002 where the part to be heated is placed onto the support surface 250 in the chamber 102. The support surface 250 is then positioned so that the part is located in a predetermined location with respect to the coil 212 (step 1004), and the chamber is sealed (step 1006). Next, the vacuum system 206 is activated (step 1008). Activation of the vacuum system 206 causes gas molecules within the chamber 102 to be removed therefrom, thereby lowering the pressure within the chamber 102.

Next, the pressure within the chamber is determined (step 1010) by measuring the output of pressure sensor 269. The pressure determined in step 1010 is compared to a predetermined pressure value (step 1012). In one embodiment the predetermined pressure value is about $5 \times 10^{-5}$ torr. If the pressure determined in step 1010 is less than or equal to the predetermined pressure value, control proceeds to step 1014, otherwise control returns to step 1010. In step 1014, the induction heating unit 204 is used to heat the part to X degrees as measured by infrared pyrometer 120. X can range between 400 and 1000 degrees. However, X should not be so high that it is high enough to melt the filler metal. X need only be high enough to evaporate the binder that is in the braze paste and/or out-gas the part being heated. Preferably, X is about 700 degrees Fahrenheit.

Next, the pressure in the chamber 102 is determined (step 1016). The pressure determined in step 1016 is compared to a second predetermined pressure value (1018). In one embodiment the second predetermined pressure value is about $1 \times 10^{-6}$ torr. If the pressure determined in step 1016 is less than or equal to the second predetermined pressure value, control proceeds to step 1020, otherwise control returns to step 1016. In step 1020, the induction heating unit 204 is used to heat the part to Z degrees, wherein Z is greater than X. Preferably, Z is a high enough temperature to melt the filler without melting the parts being brazed (e.g., Z is between 1000 and 3000 degrees Fahrenheit). In one embodiment, Z is about 2100 degrees Fahrenheit.

The next step is to simply wait for a predetermined amount of time (step 1022). In one embodiment, the predetermined amount of time is 300 seconds. After the predetermined amount of time has elapsed, the induction heating unit 204 is directed to cease heating the part (step 1024) and a "quenching" gas is introduced into the chamber 102 to cool the part (1026). Next, the vacuum system 206 is de-activated (step 1028) and the part is removed from the chamber 102 (step 1030).

Figure 11A:
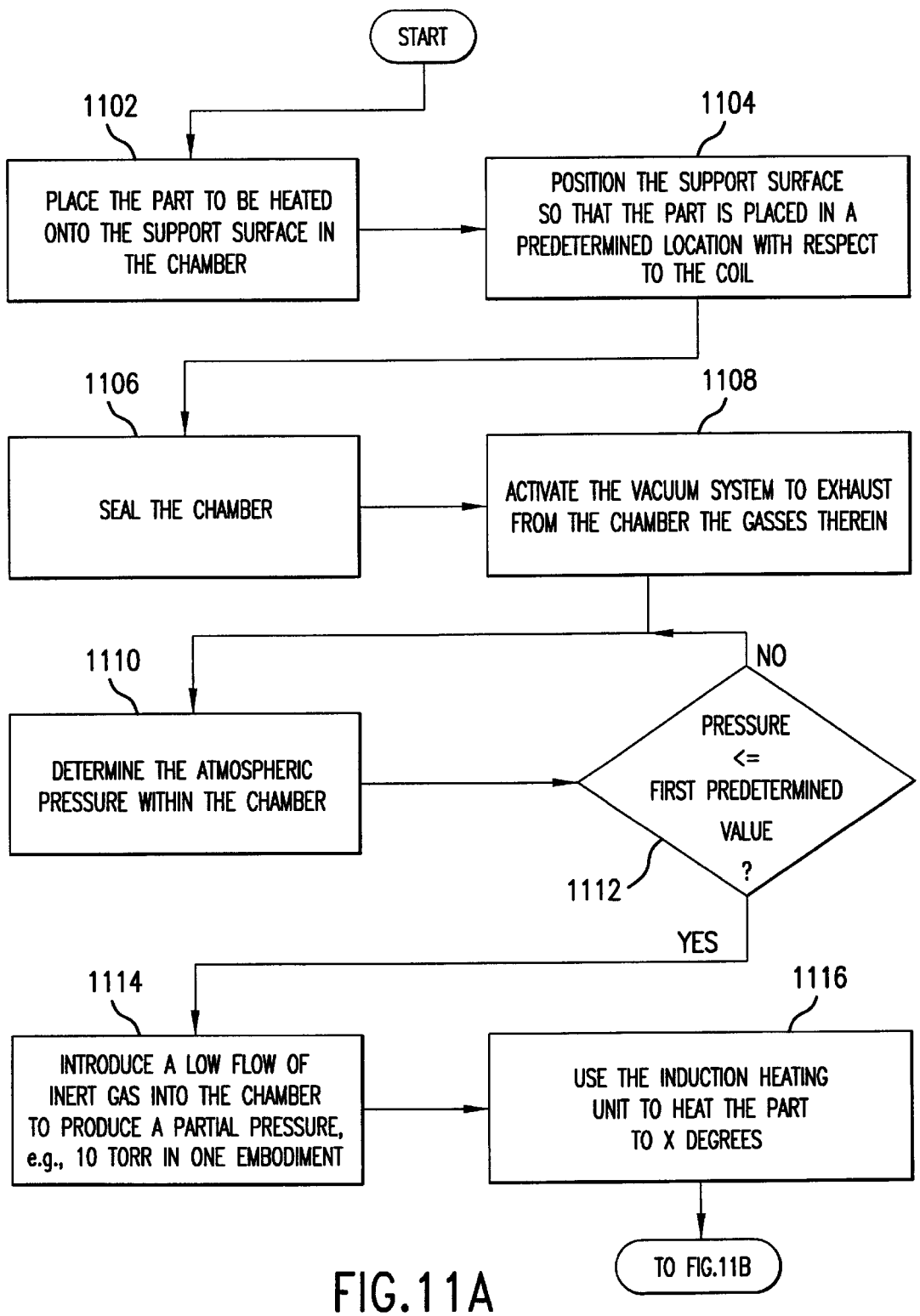
FIGS. 11A and 11B are a flow chart illustrating an inert atmosphere brazing process.
Figure 11B:
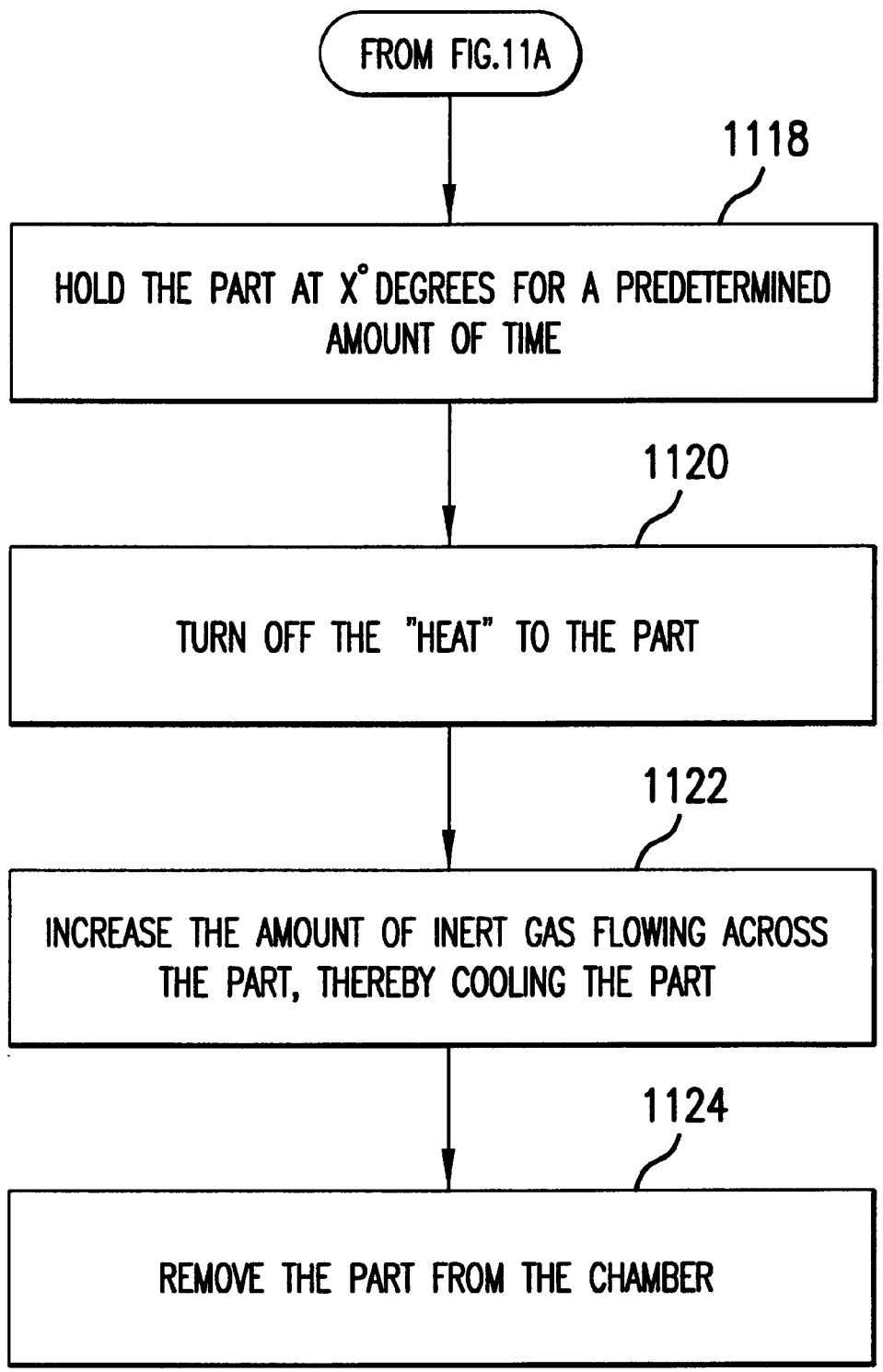

FIGS. 11A and 11B illustrate a process 1100 for brazing a part in an inert atmosphere. One skilled in the art of computer programming can program controller 202 to perform one or more of the steps of process 1100.

Process 1100 begins in step 1102 where the part to be heated is placed onto the support surface 250 in the chamber 102. The support surface 250 is then positioned so that the part is located in a predetermined location with respect to the coil 212 (step 1104), and the chamber is sealed (step 1106). Next, the vacuum system 206 is activated (step 1108). Activation of the vacuum system 206 causes gas molecules within the chamber 102 to be removed therefrom, thereby lowering the pressure with the chamber 102.

Next, the pressure within the chamber is determined (step 1110). The pressure determined in step 1110 is compared to a predetermined pressure value (step 1112). In one application, the predetermined pressure value is about $1 \times 10^6$ torr. If the pressure determined in step 1110 is less than or equal to the predetermined pressure value, control proceeds to step 1114, otherwise control returns to step 1110. In step 1114, a "low" flow of inert gas is introduced into the chamber 102 to produce partial pressure (e.g., 10 torr in one embodiment). Preferably, the inert gas flows directly across the part. After the pressure in the chamber 102 reaches the predetermined partial pressure as a result of introducing the inert gas into the chamber, control proceeds to step 1116.

Referring now to step 1116, the induction heating unit 204 is used to heat the part to X degrees as measured by pyrometer 120. X usually ranges between 800 and 3000 degrees Fahrenheit, depending on the application. Preferably, X is a high enough temperature to melt the filler without melting the parts being brazed. The next step is to hold the temperature at X degrees for a predetermined amount of time (step 1118). After the predetermined amount of time has elapsed, the induction heating unit 204 is directed to cease heating the part (step 1120), and the amount of inert gas flowing across the part per a given amount of time is increased so as to "quench" (i.e., cool) the part (step 1122). Lastly, the part is removed from the chamber 102 (step 1124).

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An induction heating system, comprising:

a vacuum chamber;

a support surface located within the chamber for providing a surface onto which a part to be heated is placed;

moving means connected to the support surface for moving the support surface within the chamber;

a vacuum system connected to the chamber for exhausting gases from the chamber;

an electrically conductive coil located inside of the chamber or located adjacent to the chamber;

a power supply for providing an alternating current to the coil;

a temperature sensing means for sensing the temperature of the part;

an operator interface for displaying a user interface comprising one or more selectable push button icons and for receiving input from an operator; and a control system interfaced to the operator interface, the vacuum system, the power supply, the moving means, and the temperature sensing means, wherein the controller is programmed to perform a procedure in response to an operator selecting one of the selectable push button icons, the procedure comprising the steps of:

sending a signal to the moving means to cause the moving means to move the support surface so that the part is appropriately located with respect to the coil;

sending a signal to the vacuum system to cause the vacuum system to exhaust gases from the chamber;

monitoring the pressure within the chamber;

after the pressure within the chamber reaches a predetermined threshold, sending a signal to the power supply to cause the power supply to provide to the coil an alternating current having sufficient power to heat the part to a predetermined temperature;

waiting for a predetermined amount of time; and after the predetermined amount of time has elapsed, sending a signal to the power supply causing the power supply to stop providing the alternating current to the coil.

2. The induction heating system of claim 1, further comprising a parallel resonant tank circuit connected between the power supply and the coil.

3. An induction heating system, comprising:

two or more vacuum chambers;

a valve system;

a single vacuum system for exhausting gases from the chambers, the single vacuum system being connected to each of the two or more vacuum chambers through the valve system;

two or more electrically conductive coils, wherein each one of the coils is either located inside of or adjacent to one of the two or more chambers;

a single power supply coupled to each of the two or more coils, wherein the power supply is for providing an alternating current to the coils;

an operator interface for displaying a user interface and for receiving input from an operator; and a control system, interfaced to the operator interface, the vacuum system, and the power supply, for receiving signals from the operator interface after the operator interface receives an input from the operator and for sending control signals to the power supply, the vacuum system, and the valve system.

4. A method for joining two or more parts, comprising the steps of:

placing the parts into a vacuum chamber;

positioning the parts so that the parts are placed in a predetermined location with respect to an induction heating coil;

sealing the vacuum chamber;

activating a vacuum system to exhaust gases from the vacuum chamber, thereby lowering the pressure within the chamber;

providing to the coil a first alternating current for the purpose of inductively heating at least a portion of one of the parts to a first predetermined temperature, wherein the first alternating current is provided to the coil after the pressure within the chamber reaches a first predetermined pressure level;

providing a second alternating current to the coil to inductively heat the portion of the part to a second predetermined temperature after the pressure within the chamber reaches a second predetermined pressure level, wherein the second predetermined pressure level is less than the first predetermined pressure level; and maintaining the temperature of the portion of the part at the second predetermined temperature for a predetermined amount of time.

5. The method of claim 4, wherein the second predetermined pressure level is about an order of magnitude less than the first predetermined pressure level.

6. The method of claim 5, wherein the first predetermined pressure level is about $5 \times 10^{-5}$ torr and the second predetermined pressure level is about $1 \times 10^{-6}$ torr.

7. The method of claim 4, wherein the first predetermined temperature is less than the second predetermined temperature.

8. The method of claim 7, wherein the first predetermined temperature is between about 400 and 800 degrees Fahrenheit and the second predetermined temperature is between about 1000 and 3000 degrees Fahrenheit.

9. The method of claim 8, wherein the first predetermined temperature is about 700 degrees Fahrenheit and the second predetermined temperature is about 2100 degrees Fahrenheit.

10. An induction heating system, comprising:

a vacuum chamber;

a support located within the chamber for supporting a part to be heated;

moving means connected to the support for moving the support within the chamber;

a vacuum system connected to the chamber for exhausting gases from the chamber;

an atmospheric control system means, connected to the chamber, for showering the part with a flow of a gas for the purpose of cooling the part;

an electrically conductive coil located inside of the chamber or located adjacent to the chamber;

a power supply for providing an alternating current to the coil;

a temperature sensing means for sensing the temperature of the part;

an operator interface for displaying a user interface and for receiving input from an operator; and a control system, interfaced to the operator interface, the temperature sensing means, the power supply, the vacuum system, the atmospheric control system means, and the moving means, for receiving input from the operator interface and for sending control signals to the power supply, the vacuum system, the atmospheric control system means, and the moving means.

11. The induction heating system of claim 10, wherein the gas is an inert gas.

12. An induction heating system for use in brazing applications, comprising:

a chamber;

a vacuum system coupled to the chamber, wherein the vacuum system is configured to exhaust gases from the chamber;

a support located inside of the chamber that supports one or more parts to be heated;

an electrically conductive element located inside of the chamber or located adjacent to the chamber;

an induction heating unit that is electrically coupled to the element and that uses the element to inductively heat the one or more parts;

a temperature sensing means for sensing the temperature of the one or more parts located within the chamber;

a pressure sensor for sensing the pressure within the chamber;

an operator interface that displays a user interface and that receives input from an operator; and a control system interfaced to the operator interface, the vacuum system, the induction heating unit, and the temperature sensing means, wherein the control system is programmed to perform a procedure, the procedure comprising the steps of:

sending a control signal to the vacuum system to cause the vacuum system to lower the pressure within the chamber;

reading an output of the pressure sensor to monitor the pressure within the chamber;

comparing the pressure within the chamber to a predetermined pressure threshold; and after the pressure within the chamber reaches or falls below the predetermined pressure threshold, sending one or more control signals to the induction heating unit, the one or more control signal causing the induction heating unit to inductively heat the one or more parts to a predetermined temperature using the conductive element.

13. The induction heating system of claim 12, wherein the procedure further comprises the step of monitoring the temperature of at least a portion of one of the one or more parts being heated.

14. The induction heating system of claim 13, wherein the procedure further comprises the step of sending one or more control signals to the induction heating unit so as to maintain the temperature of the portion being monitored at or about a predetermined temperature for at least a predetermined amount of time.

15. The induction heating system of claim 12, wherein the procedure further comprises the steps of:

activating a timer to expire after a predetermined interval of time has passed; and sending a second control signal to the induction heating unit after the timer expires, wherein the second control signal causes the induction heating unit to cease heating the one or more parts.

16. The induction heating system of claim 12, further comprising a motor, coupled to the support, for moving the support so that the one or more parts within the chamber can be moved, and wherein the procedure further comprises the steps of sending a control signal to the motor, wherein the control signal sent to the motor causes the motor to move the support so that the one or more parts are appropriately positioned with respect to the element.

17. The induction heating system of claim 12, further comprising an atmospheric control system means for quenching the one or more parts after the one or more parts have been heated.

18. The induction heating system of claim 12, wherein the procedure further comprises the step of:

comparing the pressure within the chamber to a second predetermined pressure threshold after the pressure within the chamber reaches or falls below the first predetermined pressure threshold; and sending a second control signal to the induction heating unit after the pressure within the chamber reaches or falls below the second predetermined pressure threshold, wherein the second control signal causes the induction heating unit to inductively heat the one or more parts to a second predetermined temperature, wherein the second predetermined temperature is greater than the first predetermined temperature.

19. The induction heating system of claim 18, wherein the procedure further comprises the steps of:

activating a timer to expire after a predetermined interval of time has passed; and sending a third control signal to the induction heating unit after the timer expires, wherein the third control signal causes the induction heating unit to cease heating the one or more parts.

20. An induction heating system for use in brazing applications, comprising:

a chamber;

a vacuum system coupled to the chamber, wherein the vacuum system is configured to exhaust gases from the chamber;

a source of inert gas coupled to the chamber through a valve;

an electrically conductive element located inside of the chamber or located adjacent to the chamber;

an induction heating unit that is electrically coupled to the element and that uses the element to inductively heat a part located in the chamber;

a temperature sensing means for sensing the temperature of at least a portion of the part;

a pressure sensor for sensing the pressure within the chamber;

an operator interface that displays a user interface and that receives input from an operator; and a control system interfaced to the operator interface, the vacuum system, the induction heating unit, the temperature sensing means, and the valve, wherein the control system is programmed to perform a procedure, the procedure comprising the steps of:

sending a control signal to the vacuum system to cause the vacuum system to lower the pressure within the chamber;

opening the valve to allow the inert gas to flow into the chamber and produce a partial pressure within the chamber;

sending one or more control signals to the induction heating unit to cause the induction heating unit to inductively heat said portion of the part to a predetermined temperature using the conductive element.

21. The induction heating system of claim 20, wherein after said portion of the part reaches the predetermined temperature, the procedure further comprises the step of sending one or more control signals to the induction heating unit to maintain the temperature of said portion of the part at the predetermined temperature for at least about a predetermined amount of time.

22. The induction heating system of claim 21, wherein, after the temperature of said portion of the part has been maintained at the predetermined temperature for about at least the predetermined amount of time, the procedure further comprises the steps of:

sending a control signal to the induction heating unit that causes the induction heating unit to cease inductively generating currents in the part; and opening the valve further to increase the flow of inert gas into the chamber to cool the part.

23. The induction heating system of claim 20, wherein, after said portion of the part reaches the predetermined temperature, the procedure further comprises the step of sending one or more control signals to the induction heating unit to maintain the temperature of said portion of the part at the predetermined temperature for not more than about a predetermined amount of time.

24. The induction heating system of claim 23, wherein, after the temperature of said portion of the part has been maintained at the predetermined temperature for not more than about the predetermined amount of time, the procedure further comprises the steps of:

sending a control signal to the induction heating unit that causes the induction heating unit to cease inductively generating currents in the part; and opening the valve further to increase the flow of inert gas into the chamber to cool the part.

25. A method for inductively heating a part, comprising the steps of:

placing the part into a chamber;

positioning the part near an induction heating element;

sealing the chamber;

exhausting gases from the chamber, thereby lowering the pressure within the chamber;

comparing the pressure within the chamber to a first predetermined pressure level;

using the induction heating element to inductively heat at least a portion of the part to a first predetermined temperature after the pressure within the chamber reaches or falls below the first predetermined pressure level;

comparing the pressure within the chamber to a second predetermined pressure level after the pressure within the chamber reaches or falls below the first predetermined pressure level; and using the induction heating element to inductively heat the portion of the part to a second predetermined temperature after the pressure within the chamber reaches or falls below the second predetermined pressure level.

26. The method of claim 25, wherein the second predetermined temperature is greater than the first predetermined temperature.

27. The method of claim 26, wherein the first predetermined pressure level is greater than the second predetermined pressure level.

28. The method of claim 27, further comprising the step of maintaining the temperature of the portion of the part at the second predetermined temperature for at least about a predetermined amount of time.

29. The method of claim 28, further comprising the step of introducing a flow of quenching gas into the chamber to cool the part after maintaining the temperature of the portion of the part at the second predetermined temperature for at least about the predetermined amount of time.

30. The method of claim 27, further comprising the step of maintaining the temperature of the portion of the part at the second predetermined temperature for not more than about a predetermined amount of time.

31. The method of claim 30, further comprising the step of introducing a flow of quenching gas into the chamber to cool the part after maintaining the temperature of the portion of the part at the second predetermined temperature for not more than about the predetermined amount of time.

* * * * *